United States Patent Office 3,597,301
Patented Aug. 3, 1971

3,597,301
TREATMENT OF FIBROUS REINFORCING ELEMENTS
John R. Le Blanc, Wilbraham, Edward Lavin, Longmeadow, Albert H. Markhart, Wilbraham, and Irving Serlin, Springfield, Mass., assignors to Monsanto Company, St. Louis, Mo.
No Drawing. Filed Jan. 2, 1968, Ser. No. 694,840
Int. Cl. B32b 5/16, 17/10; C08j 1/36
U.S. Cl. 161—93
10 Claims

ABSTRACT OF THE DISCLOSURE

Disclosed herein are specially treated fibrous reinforcing elements which are adapted for use as the reinforcing element in fibre reinforced resin composites. The treated fibrous reinforcing elements provide resin impregnated fiber reinforced structures which exhibit improved thermal stability and prolonged useful life at elevated temperatures. In the practice of the present invention the fibrous reinforcing element is treated with a compound selected from the group consisting of boric acid, phosphoric acid, sulfuric acid and their acid derivatives and esters and salts of the foregoing acids.

BACKGROUND OF THE INVENTION

(1) Field of the invention

This invention relates to the treatment of fibrous reinforcing elements adapted for use as the reinforcing element in resin impregnated fibrous reinforced structures so as to provide fibrous reinforced resin composites having improved oxidative thermal stability and good physical properties even after prolonged exposures to high temperatures such as 700° F. More particularly, it relates to treating the fibrous reinforcing elements with a compound selected from the group consisting of boric acid, phosphoric acid, sulfuric acid and their acid derivatives and esters and salts of the foregoing acids.

(2) Description of the prior art

Fibrous reinforcing elements such as glass fibers, carbon fibers, graphite fibers, asbestos fibers, quartz fibers, refrasil fibers, boron fibers and other metallic fibers as well as cloths and mats prepared from these fibers are well known in the reinforced polymer art. These reinforcing elements are usually impregnated with a polymer solution, molten polymer or polymer forming varnish and then cured to provide strong, durable structures with wide utility as structural and non-structural components. Excellent high temperatures resistant structures have been obtained using the aforementioned fibrous reinforcing elements and polymer systems formed from (1) polycarboxylic components containing from 3 to 4 carboxylic groups per molecule and derivatives thereof such as their esters and ammonium salts and (2) a polyamine component containing at least two primary amino groups per molecule. These polymer forming systems and resulting reinforced polymers are described in U.S. Pat. 3,347,808 and other patents. The reinforced polymeric products described in these patents are generally characterized by having excellent thermal stability when exposed to high temperatures for prolonged periods of time. However, the increasing demands of modern technology is requiring even greater performance and improved physical properties in polymeric materials than ever before. Consequently, new applications and end uses utilizing high temperature resistant polymeric materials are requiring even greater oxidative thermal stability and retention of physical properties after prolonged exposure to high temperatures than was heretofore thought possible with known materials.

The continuing effort being made to improve the performance of these reinforced structures has been directed to the polymeric compositions per se or has been directed to finding new fibers with better properties for use as the reinforcing elements. Moreover, the search for new reinforcing elements involves a time lag in discovering, testing and utilizing new reinforcing elements. Certain present applications require the improved performance now, and a problem exists in the art involving the upgrading of the presently known fibrous reinforcing agents.

A definite need exists in the reinforced polymer art for structural composites having improved oxidative thermal stability and prolonged useful life at high temperatures. A further need exists for improving the performance of presently known and acceptable reinforcing materials so as to make them immediately available in applications requiring improved oxidative thermal stability and prolonged useful life at high temperatures.

SUMMARY OF THE INVENTION

An objection of this invention is to provide treated fibrous reinforcing elements for fiber reinforced resin composites in order to improve the thermal stability of the reinforced composite and prolong its useful life during exposure to high temperatures.

Another object of this invention is to provide a process for treating fibrous reinforcing elements adapted for use in fiber reinforced resin composites in order to improve the thermal stability of the resulting reinforced composite.

Another object is to provide treated fibrous reinforcing agents.

Another object is to provide a process for treating fibrous reinforcing agents.

The present invention is directed to the treatment of fibrous reinforcing elements which are adapted for use as the reinforcing element in resin impregnated structures so as to provide a resin impregnated fiber reinforced composite with improved physical properties such as improved oxidative thermal stability and flexural strength and prolonged useful life at elevated temperatures. The improved thermal stability in these resin impregnated fiber reinforced composites, which is unexpectedly obtained in the practice of this invention, is achieved by treating the fibrous reinforcing element with a compound selected from the group consisting of boric acid, phosphoric acid, sulfuric acid, acid derivatives of these acids and the ester and ammonium salt derivatives of the foregoing acids, such that the loading of the fibrous reinforcing element is at least 0.01 weight percent of the additive compound based on the weight of the fibers. Loading is used to indicate the amount of the compound deposited on the glass cloth.

The treatment of the fibrous reinforcing element is conveniently carried out with a solution of the particular compound to be used. In this situation the "wet pickup" of the fibrous reinforcing element is measured and the concentration of the treating solution is adjusted so that the loading on the reinforcing element is at least 0.01 weight percent based on the weight of the cloth. For example, if the reinforcing element has a "wet pickup" of 50%, the concentration of the compound used to treat the reinforcing element should be 0.02% of the weight of the solution, in order to provide a loading of at least 0.01 weight percent.

Alternatively, the treating compound may be applied to the fibrous reinforcing element by dusting, spraying, atomizing, fluid bed coating, or other related techniques.

The treatment involved in the present invention is applicable to many different types of fibrous reinforcing elements such as glass fibers, carbon fibers, graphite fibers, asbestos fibers, quartz fibers, refrasil fibers, boron fibers and other metallic fibers. This may be in the form of random fibers, oriented fibers, reticulate fibers or woven networks of fibers.

The foregoing reinforcing elements are impregnated with various types of resinous or polymeric compositions such as phenolic resins, epoxy resins, melamine and silane modified phenolics, polyesters, polycarbonates, polyurethanes, polyamides, polyamide acids, polystyrene, etc. and the monomeric type polymer forming varnishes of the foregoing polymers. The impregnated fibers are then cured into a resin impregnated fibrous reinforced structure which is referred to as a composite. These composites can be single ply coupons prepared by impregnating a woven network of fibers with a polymeric or polymer forming material or they may be multiply laminates as is described below. The term composite also includes those materials where random or reticulate non woven fibers are incorporated in a resinous component which is either a polymer solution or molten polymer or is a polymer forming composition. These and other resin/fiber combinations are well known to those skilled in the art.

DESCRIPTION OF THE PREFERRED EMBODIMENTS

The preferred materials for impregnating the fibrous reinforcing elements which have been treated in accordance with the teachings of the present invention in order to prepare the composite are those polymeric compositions prepared from (1) an aromatic polycarboxylic component containing from three to four carboxylic groups per molecule selected from the group consisting of free polycarboxylic acids, esters of polycarboxylic acids, and ammonium salts of polycarboxylic acids; and (2) a polyamine component having at least two primary amino groups per molecule. The suitable derivatives of the free polycarboxylic acids include partial and full ester derivatives wherein the alcohol moiety of the ester is an aliphatic alcohol, aromatic alcohol, an amino alcohol, a polyol such as glycol and other related compounds; and partial and full ammonium salts and substituted ammonium salts of the polycarboxylic acid component wherein the ammonium salt is prepared using ammonia or substituted ammonia such as primary, secondary and tertiary amines.

The free tetracarboxylic acids and their ester derivatives which are used to prepare the preferred resin component used in the present invention are represented by the following formula:

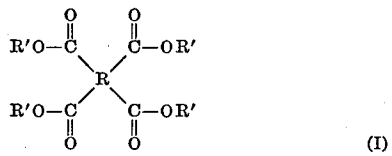

SUMMARY OF THE INVENTION wherein R is a tetravalent organic radical selected from the group consisting of aromatic carboxylic, aromatic heterocyclic, combination of aromatic carboxylic and aliphatic, combinations of aromatic heterocyclic and aliphatic, and substituted groups thereof. However, the preferred tetravalent radicals are aromatic radiacls in which the R groups have at least one ring of 6 carbon atoms characterized by benzenoid unsaturation (alternate double bonds in a ring structure), and particularly those aromatic tetravalent radicals wherein the four carboxylic groups are each attached to separate carbon atoms in a benzene ring and wherein the carbon atoms of each pair of carboxylic groups is directly attached to adjacent carbon atoms in a benzene ring of the R group, and wherein R' is hydrogen, alkyl radicals of from 1 to 12 carbon atoms, oxyalkyl radicals of from 2 to 10 carbon atoms, hydroxyalkyls and hydroxy(oxy)alkyls, wherein the alkyl radicals contain from 2 to 10 carbon atoms; aryl radicals of from 6 to 16 carbon atoms; and N,N dialkyl alkyl radicals of the following general formula:

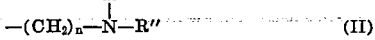

wherein R" is an alkyl radical of from 1 to 5 carbon atoms and $n$ is an integer of from 2 to 6. The preferred R' alkyl radicals are those containing from 1 to 8 carbon atoms.

Illustrations of tetracarboxylic acid suitable for use in the present invention include:

2,2'-3,3'-benzophenone tetracarboxylic acid;
3,4,3',4'-benzophenone tetracarboxylic acid, pyromellitic acid;
2,3,6,7-naphthalene tetracarboxylic acid;
3,3'-,4,4'-diphenyl tetracarboxylic acid;
1,2,5,6-naphthalene tetracarboxylic acid;
2,2'-3,3'-diphenyl tetracarboxylic acid;
2,2-bis(3,4-dicarboxyphenyl) propane acid;
bis(3,4-dicarboxyphenyl)sulfone acid;
3,4,9,10-perylene tetracarboxylic acid;
bis(3,4-dicarboxyphenyl)ether acid;
ethylene tetracarboxylic acid;
naphthalene-1,2,4,5-tetracarboxylic acid;
naphthalene-1,4,5,8-tetracarboxylic acid;
decahydronaphthalene-1,4,5,8-tetracarboxylic acid;
4,8-dimethyl-1,2,3,5,6,7-hexahydronaphthalene-1,2,5,6-tetracarboxylic acid;
2,6-dichloronaphthalene-1,4,5,8-tetracarboxylic acid;
2,7-dichloronaphthalene-1,4,5,8-tetracarboxylic acid;
2,3,6,7-tetrachloronaphthalene-1,4,5,8-tetracarboxylic acid;
phenanthrene-1,8,9,10-tetracarboxylic acid;
cyclopentane-1,2,3,4-tetracarboxylic acid;
pyrrolidine-2,3,4,5-tetracarboxylic acid;
pyrazine-2,3,5,6-tetracarboxylic acid;
2,2-bis(2,3-dicarboxyphenyl)propane acid;
1,1-bis(2,3-dicarboxyphenyl)ethane acid;
1,1-bis(3,4-dicarboxyphenyl)ethane acid;
bis(2,3-dicarboxyphenyl)methane acid;
bis(3,4-dicarboxyphenyl)methane acid;
bis(3,4-dicarboxyphenyl)sulfone acid;
benezne-1,2,3,4-tetracarboxylic acid;
1,2,3,4-butane tetracarboxylic acid; thiophene-2,3,4,5-tetracarboxylic acid, etc.

Other suitable tetracarboxylic acids may be prepared by linking two mols of trimellitic dianhydride through their free acid group (as described in detail in U.S. Pat. 3,182,073 and 3,347,808) and then converting the dianhydride group to the free acid or its ester derivatives through conventional methods. The free acids can then be used to prepare the ammonium salt derivatives using conventional methods.

The free tricarboxylic acids and their ester derivatives which are used to prepare the preferred resin components used in the present invention are represented by the following formula:

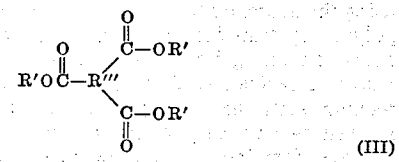

wherein R''' is a trivalent aromatic radical of from 6 to 18 carbon atoms containing at least one pair of the carboxyl groups in a 1,2 position or a 1,3 position with respect to each other which permits the formation of a cyclic ring structure. The preferred R''' groups have at least one ring of 6 carbon atoms characterized by benzenoid unsaturation i.e., alternate double bonds in a ring structure. R' is as defined in Formula I above.

Examples of these tricarboxylic compounds include trimellitic acid, 1,3,8-tricarboxynaphthalene, benzophenone tricarboxylic acids such as benzophenone-3,3',4'-tricarboxylic acid, benzophenone - 4,3',4' - tricarboxylic acid, etc. R''' also includes the trivalent radicals of benzene, naphthalene, biphenyl, diphenyl ether, diphenyl sulfide, diphenyl sulfone, etc. Preferred tricarboxylic compounds are the isomers of trimellitic acid and benzophenone tricarboxylic acid.

The free polycarboxylic acids used may be prepared by reacting the corresponding dianhydrides in the case of tetracarboxylic compounds or monoanhydride in the case of tricarboxylic compounds with water or other methods well known to those skilled in the art. In a similar fashion the preparation of the ammonium salt derivatives of the polycarboxylic acids is well known to those skilled in the art.

The ester derivatives of the foregoing polycarboxylic acids are readily prepared by reacting the corresponding dianhydride or monoanhydride with an alcohol such as ethanol. By controlling the reaction conditions one may prepare partial or full ester derivatives of the type described above in reference to Formulae I and III. Examples of other suitable alcohols in addition to ethanol mentioned above include methanol, propanol, butanol, pentanol, hexanol, heptanol, octanol, ethylene glycol, diethylene glycol, tri-ethylene glycol, 1,3-propane diol, 1,2-propane diol; 2-(dimethylamino)ethanol, 3-(dimethylamino) propanol; 3-(N-ethyl-N-methyl amino) propanol, etc.

The tetracorboxylic acid and tricarboxylic acid esters used to prepare the resin component used in the practice of this invention are available commercially or can be readily prepared by one skilled in the art according to the procedures set forth in U.S. Pat. 3,347,808 or standard reference texts such as Heilbron and Bunbry, "Dictionary of Organic Compounds," Eyre and Spottiswood, London (1953), as well as other references which are well known to those skilled in the art.

The salt derivatives of the polycarboxylic acids, which are reacted with the polyamine components to produce the polymeric compositions used in the present invention, are prepared by reacting a polycarboxylic acid of the type represented by Formulae I and/or III above wherein R' is hydrogen, with ammonia and its substituted derivatives.

The substituted derivatives of ammonia used in the present invention include those of the following general formula:

(IV)

which are prepared by replacing the hydrogen atoms on the ammonia molecule with radicals selected from the group consisting of alkyl, aryl or cycloalkyl.

$R_x$, $R_y$, and $R_z$ in the foregoing Formula IV are selected from the group consisting of hydrogen, alkyl radicals of from 1 to 8 carbon atoms, cycloalkyl radicals of from 5 to 8 carbon atoms and aryl radicals of from 6 to 16 carbon atoms.

In the preferred substituted ammonia derivatives $R_x$, $R_y$ and $R_z$ are alkyl of from 2 to 8 carbon atoms, cycloalkyl of from 5 to 8 carbon atoms, and aryl of from 6 to 10 carbon atoms.

Examples of compounds that are reacted with the polycarboxylic acid components to form the polycarboxylic acid substituted ammonium salt derivatives which are used in the practice of this invention include ammonia and its substituted derivatives. These derivatives of ammonia include monomethylamine, diethylamine, trimethylamine, thiethylamine, tripropylamine, tri-n-butylamine, tri-iso-pentylamine, tripentylamine, tri-n-hexylamine, tri-n-heptyl amine, N-methyl diethylamine, N,N-dimethylbenzylamine, N-ethyldibenzylamine, triphenyl amine, dimethylaniline, diethylaniline, triethylene diamine, etc. Other compounds which may be used to form salts with the polycarboxylic compounds include pyridine type compounds such as halo-pyridines such as 2-chloropyridine, etc.; alkyl substituted pyridines wherein the alkyl groups contain from 1 to 4 carbon atoms such as methyl pyridines, 2,4,6-trimethyl pyridine, 2-ethyl-pyridine, 4-ethyl pyridine, pyridines such as pyridine-1-oxide, pyridine-1-sulfide and their alkyl derivatives wherein the alkyl groups contain from 1 to 4 carbon atoms; aromatic pyridines such as 2,2'-bipyridine, 4-benzylpyridine, etc.; other heterocyclic nitrogen compounds would include quinoline, pyrimidine and its alkyl derivatives wherein the alkyl group contains from 1 to 4 carbon atoms; pyrazine, 2-methyl pyrazine, 2-ethyl pyrazine, etc. Also suitable are quinaldines, acridine,s isoquinolines, quinoxalines, pyridiazines, S-triazine and other triazines, cinnolines, quinazolines and their alkyl derivatives wherein the alkyl group contains from 1 to 4 carbon atoms, tetramethylguandine, etc. Also contemplated is the use of alkanol amines such as 3-diethylamino-1-propanol, etc. The preferred substituted ammonia derivatives are the tertiary amines.

The expression "ammonium salts" is used herein to include those salts prepared using ammonia and the substituted derivatives of ammonia set forth above. The pyridine compounds are also included as derivatives of ammonia for purposes of the present invention.

The preferred tetracarboxylic components are the ester derivatives of benzophenone tetracarboxylic acid with the di(alkyl), di(oxyalkyl) and di(hydroxyalkyl) derivatives being especially preferred. The preferred tricarboxylic components are the free trimellitic and benzophenone acids and their partial and full ester derivatives. In the especially preferred embodiment the alkyl group of the ester contains from 1 to 4 carbon atoms.

The polyamines used in the practice of the present invention include diamines characterized by the formula: $H_2N-R_1-NH_2$ wherein $R_1$ is a divalent radical containing at least two carbon atoms selected from the following groups: aromatic, aliphatic, cycloaliphatic, combination of aromatic and aliphatic, heterocyclic and bridged aromatic radicals wherein the bridging group is a divalent radical selected from the group consisting of alkylene of from 1 to 6 carbon atoms, oxygen, arylene of from 6 to 16 carbon atoms, —NH—, sulfur, sulfonyl, carbonyl, phosphorous, phosphonyl, silicon and derivatives thereof. The preferred $R_1$ groups in the diamines are the aromatic amines containing at least one ring of 6 carbon atoms, characterized by benzenoid unsaturation. Such $R_1$ groups include para-phenylene, meta-phenylene, bisphenyl radicals, fused ring systems having 2 to 4 aromatic nuclei, wherein the two amine groups would be located on separate aromatic nuclei and bridged organic radicals of the general formula:

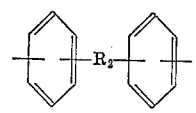

wherein $R_2$ is a divalent radical selected from the group consisting of an alkylene radical of from 1 to 6 carbon atoms, arylene radicals of from 6 to 16 carbon atoms, oxygen, —NH—, carbonyl, sulfonyl, phosphonyl and silyl radicals wherein the substituent groups on the silyl are aryl and those structures wherein the $R_2$ group is a divalent linking moiety joining the aromatic nuclei by ester, amide and thioester linkages.

Among the diamines which are suitable for use to prepare the resin component used in the present invention are:

meta-phenylene diamine;
paraphenylene diamine;
4,4'-diamino-diphenyl propane;
4,4'-diamino-diphenyl methane;
benzidine;
4,4'-diamino-diphenyl sulfide;
4,4'-diamino-diphenyl sulfone;

3,3'-diamino-diphenyl sulfone;
4,4'-diamino-diphenyl ether;
2,6-diamino-pyridine;
bis-(4-amino-phenyl)diethyl silane;
bis-(4-amino-phenyl)diphenyl silane;
bis-(4-amino-phenyl)-N-methyl amine;
1,5-diamino naphthalene;
3,3'-dimethyl-4,4'-diamino-diphenyl;
3,3'-dimethoxy benzidine;
2,4-bis(beta-amino-t-butyl)toluene;
bis-(para-beta-amino-t-butyl-phenyl)ether;
para-bis(2-methyl-4-amino-pentyl)benzene;
para-bis-(1,1-dimethyl-5-amino-pentyl)benzene;
m-xylene diamine;
p-xylene diamine;
bis(para-amino-cyclohexyl)-methane;
hexamethylene diamine;
heptamethylene diamine;
octamethylene diamine;
nonamethylene diamine;
decamethylene diamine;
3-methylheptamethylene diamine;
4,4-dimethylheptamethylene diamine;
2,11-diamino-dodecane;
1,2-bis-(3-amino-propoxy)ethane;
2,2-dimethyl propylene diamine;
3-methoxy-hexamethylene diamine;
2,5-dimethyl-hexamethylene diamine;
2,5-dimethyl-heptamethylene diamine;
5-methylnonamethylene diamine;
1,4-diamino-cyclohexane;
1,12-diamino-octadecane;
2,5-diamino-1,3,4-oxadiazole;
$H_2N(CH_2)_2O(CH_2)_3NH_2$;
$H_2N(CH_2)_3S(CH_2)_3NH_2$;
$H_2N(CH_2)_3N(CH_3)(CH_2)_3NH_2$;
3,3'-dichlorobenzidine;
bis-(4-amino-phenyl)ethyl phosphine oxide;
bis-(4-amino-phenyl)-phenyl phosphine oxide;
bis-(4-amino-phenyl)N-phenylamine;
p-phenylene-bis-2(amino-1,3-benzoxazole);
2,5-bis(p-amino phenyl)-1,3,4-oxadiazole;
m-phenylene-bis-(m-aminobenzamide);
3,4'-diamino benzanilde and mixtures of the foregoing.

Other polyamines which contain from 3 to 6 amine groups per molecule may also be used. Examples of such suitable polyamines include melamine; tris-(4-aminophenyl)methylcarbinol; 3 - methyl - 4,6,4' - triamino-diphenylmethane; 1,2,4 - benzenetriamine; 1,3,5-triaminobenzene; 2,4,4'-bis-phenyltriamine; the various triaminodiphenyl ethers; tetraaminodiphenyl ethers; hexaminodiphenyl ethers; etc., the various triaminodiphenyl sulfides; tetraaminodiphenyl sulfides; pentaaminodiphenyl sulfides, etc., 3,3'-diamino-benzidine; bis(3-methyl-4,6-diaminophenyl)-methane; and various tri, tetra, penta and hexaminodiphenyl compounds wherein the two phenyl groups are bridged by an alkylene of from 1 to 6 carbon atoms, arylene of from 6 to 16 carbon atoms, oxygen, —NH—, carbonyl, sulfur, sulfonyl, phosphorous, phosphonyl and silyl radicals.

The preferred polyamines used to prepare the resin component used in this invention are the diamines, melamine and mixtures thereof. Especially preferred are the diamines set forth above wherein $R_1$ is an aromatic group containing at least one ring of 6 carbon atoms characterized by benzoid unsaturation.

The proportion of resin forming reactants can be varied over a wide range, for example one can use about 70% molar excess of the polyamine to about a 10% molar excess of the polycarboxylic compound. Preferably one would use up to a 20% molar excess of the polyamine to about a 5% molar excess of the polycarboxylic compound. More preferably, one would use equimolar amounts of the respective components.

Useful solvents with which to prepare the monomeric solutions disclosed above include organic liquids such as the lower alkyl alcohols of from 1 to 6 carbon atoms; polyols such as glycol, ethylene glycol, acetone, methyl ethyl ketone, dioxane, cresol, toluol, N-substituted pyrrolidone such as N-methylpyrrolidone, N-cyclohexylpyrrolidine, N-butylpyrrolidone, dimethylacetamide, acetanilide, dimethylformamide, high boiling petroleum hydrocarbons and mixtures thereof. Mixtures of water with certain organic liquids such as acetone and ethyl alcohol may be used where the solubility of the particular monomers permit.

The solids content of the solutions may vary over a wide range. Preferably one would use a solution with a solids content of at least 3%. Most coating applications are more economically carried out with solutions containing at least 15% solids. In the case of electrical varnishes, solids contents of at least 20% have been found most satisfactory. The concentration used is determined by the particular requirements of the end use application as is well known to those skilled in the art.

Also preferred as the resin components used in the practice of the invention are phenolic type resins and polyamide acid type resins prepared using the foregoing amine components with a tetracarboxylic acid dianhydride or an acid halide derivative of a tricarboxylic monoanhydride.

The component used to treat the fibrous reinforcing elements used in the present invention is an acid based on boron, phosphorous or sulfur, ester derivatives of these foregoing acids, ammonium salts of the foregoing acids including salts formed from the substituted derivatives of ammonia such as the primary, secondary and tertiary amines. The most commonly known boron, phosphorous and sulfur containing acids are boric acid, phosphoric acid and sulfuric acid, respectively. There are various well known other boron, phosphorous and sulfur containing acids which will be considered as acid derivatives of boric, phosphoric and sulfuric acid for purposes of the present invention.

Examples of the acid derivatives of the aforementioned boric, phosphoric and sulfuric acids include orthoboric acid, pyroboric acid, boronic acid, borinic acid, polyphosphoric acid, hypophosphoric acid, orthophosphoric acid, mono- and di-alkyl hypophosphoric acid wherein the alkyl group contains from 1 to 12 carbon atoms, mono- and di-aryl hypophosphoric acid wherein the aryl group contains from 6 to 10 carbon atoms, sulfurous acid, sulfonic acid, aryl sulfonic acids such as para-toluene sulfonic acid, benzene disulfonic acid, etc.

These acid derivatives of boric, phosphoric and sulfuric acid are also used to form ester derivatives and salt derivatives prepared from ammonia and substituted ammonia derivatives, which are used as thermal stabilizers as is outlined below.

Examples of the ester derivatives of the aforementioned boric, phosphoric and sulfuric acids include alkyl borates, alkyl phosphates, alkyl sulfates, alkyl acid borates, alkyl acid phosphates, alkyl acid sulfates, wherein the alkyl group is selected from the group consisting of alkyl and oxyalkyl radicals of from 1 to 12 carbon atoms; aryl borates, aryl phosphates and aryl sulfates; wherein the aryl group contains from 6 to 10 carbon atoms; and mixed alkyl aryl borates, sulfates and phosphates; alkaryl borates, alkaryl phosphates and alkaryl sulfates wherein the aryl group contains from 6 to 16 carbon atoms and wherein the alkyl side chain contains from 1 to 6 carbon atoms.

Further examples of these esters include methyl acid phosphate, ethyl acid phosphate, butyl acid phosphate, triethyl phosphate, tributyl phosphate, ethyl phosphate, propyl phosphate, triphenyl phosphate, amyl phosphate, cresyl diphenyl phosphate, tricresyl phosphate, methyl diethyl hypophosphate, monomethyl orthophosphate, diethyl orthophosphate, dimethyl methyl phosphate, N-methylol phosphonate, ethylhexyl diphenyl phosphate, trioctyl phosphate, and their corresponding thiophosphate analogues; trimethyl borate, triethyl borate, ethyl acid borate, phenyl acid sulfate, methyl hydrogen sulfate, dimethyl sulfate, methyl chlorosulfamate, methyl chlorosulfonate, ethylene sulfate, glyoxal sulfate, ethyl hydrogen sulfate, n-butyl hydrogen sulfate, etc.

Especially preferred are alkyl borates, alkyl phosphates and alkyl sulfates containing at least one alkyl group per molecule wherein the alkyl group contains from 1 to 8 carbon atoms.

The salt derivatives of boric acid, phosphoric acid and sulfuric acid which are used in the present invention are the ammonium salts and derivatives of ammonia. The derivatives of ammonia include primary, secondary, tertiary amines and heterocyclic amines of the type mentioned above in regard to the tetracarboxylic salt polymer forming component. Specific examples of these stabilizing salts include ammonium borates, ammonium phosphates, ammonium sulfates, tertiary amine borates, tertiary amine phosphates and tertiary amine sulfates, etc.

The amount of compound which is deposited on the fibrous reinforcing agent in the beneficial treatment of the reinforcing agent is determined by the particular compound used and the desired degree of improvement in thermal stability of the resin impregnated structure prepared using treated material as the reinforcing agent. In general, at least 0.01 weight percent and more preferably 0.05 weight percent based on the weight of the fibrous reinforcing element is loaded onto the reinforcing element in order to impart improved thermal stability to the cured resin impregnated composite.

The upper limit on the amount of thermal stabilizer loaded onto the fibrous reinforcing agent is selected so as to provide maximum thermal stability to the composite without adversely affecting other polymer properties. As a practical upper limit one would load the reinforcing element with up to 50 weight percent of the particular compound used to treat the reinforcing element. Beyond this amount no significant improvement in thermal stability is observed by a further increase in the amount of additive used.

Stated in another way, one would load between 0.01 weight percent and 50 weight percent of the treating compound onto the fibrous reinforcing medium. More preferably, one would load between 0.05 and 20 weight percent of the treating compound onto the fibrous reinforcing element. In view of the teachings set forth herein one skilled in the art will be readily able to select the loading rate for any particular treating agent/fiber system which will provide maximum thermal stability to the composite preferred using the treated reinforcing element.

The following examples are set forth in illustration of this invention and should not be construed as limitations thereof. All parts and percentages given are by weight unless otherwise indicated.

The improved thermal stability of the fiber reinforced resin composites, which are prepared with the fibrous reinforcing elements which have been treated according to the present invention, is determined below by treating 2" x 4" strips of glass or asbestos cloth of known weight, by soaking or dipping these strips in solutions of the treating agent so as to provide about 50% wet pickup and then air drying the treated cloth at 120° C. for 1 hour. The dry treated cloth is then impregnated with a polymer forming varnish prepared from a tetracarboxylic component and a polyamine component containing at least two diamine groups per molecule. The impregnated cloth (coupon) is then allowed to air dry at room temperature, then it is cured according to the following schedule:

2 hours at 120° C.
1 hour at 180° C.
16 hours at 280° C.

After this curing schedule the resin starting weight of the coupon sample is obtained and then the coupons are aged at 700° F. for varying amounts of time. After each interval of high temperature aging the percent weight loss of the coupon is calculated using conventional methods.

Alternatively, in some examples the above procedures are followed in regard to preparing the coupons and the time required for 50% resin weight loss at 700° F. is determined.

Example I (control).—This example is set forth as a control to illustrate the preparation of a typical varnish used in the impregnating of glass cloth. The glass cloth used in this example is not treated with a compound in accordance with the teachings of the present invention.

Hard drape Style 181E-A1100 (soft) glass cloth is soaked for about 16 hours in water which contains no treating agent. The wet pickup is about 50%. The cloth is then dried for 1 hour at 120° C. This cloth is then used to prepare resin impregnated coupons. The coupons are prepared by impregnating the cloth with an impregnating varnish of the type described in U.S. Pat. 3,347,808. This varnish is prepared by dissolving equimolar quantitites of benzophenonetetracarboxylic acid diethyl ester (414 parts) and m-phenylene diamine (108 parts) in a solvent which is a 4/1 by volume mixture of N-methyl pyrrolidone/ethanol. The solids content of the resulting solution is about 62.5%. This solution is used to impregnate the glass cloth which is then cured and tested for thermal stability according to the procedures outlined above. The results of this thermal stability testing is tabulated below in Table I.

Example 2.—Example 1 is repeated here except that the water used to soak the glass cloth contains 5% by weight of ethyl acid phosphate. The wet pickup on the cloth is about 50% and the loading on the cloth is calculated to be 2.5 weight percent of ethyl acid phosphate. The cloth is then dried and used to prepare coupons according to the general procedure of Example 1. These coupons are then tested for percent weight loss upon exposure to 700° F. The comparative data for Examples 1 and 2 are listed in the following Table I.

TABLE I.—PERCENT WEIGHT LOSS ON EXAMPLES 1 AND 2

| Example | Treatment of cloth | Percent loading | Hours at 700° F. in air | | |
|---|---|---|---|---|---|
| | | | 71 | 167 | 258 |
| 1 (Control) | None | None | 8.7 | 41.4 | 60 |
| 2 | Ethyl acid phosphate | 2.5 | 4.4 | 8.5 | 11.8 |

The data in Table I clearly illustrates the significant improvement in resin weight loss that is obtained when the fibrous reinforcing element is treated in accordance with the practice of this invention. Note that after 258 hours exposure at 700° F. in air, Example 1, the sample prepared with untreated glass cloth, undergoes approximately five times as much resin weight loss as does Example 2 which uses a treated glass cloth.

The following Examples 3 to 7 are set forth to further illustrate that treatment of fibrous reinforcing elements in accordance with the practice of the present invention provides composite structures with improved thermal stability. In each example the general procedures of Examples 1 and 2 above are followed except that the glass cloth used is dipped in a cold treating bath for only five minutes as opposed to the 16 hour soak used in Examples 1 and 2. The thermal stability tests are conducted as outlined above. The results of these tests are listed in Tablet II below.

TABLE II.—PERCENT WEIGHT LOSS ON COUPONS PREPARED IN EXAMPLES 3 TO 7

| Example | Treatment of cloth [1] | Percent loading | Hours at 700° F. in air |
|---|---|---|---|
| 3 (Control) | None | None | 36.2 |
| 4 | 1% butyl acid phosphate | 0.5 | 22.8 |
| 5 | 1% phosphoric acid | 0.5 | 12.1 |
| 6 | 0.1% sulfuric acid | 0.05 | 28.6 |
| 7 | 0.1% toluene sulfonic acid | 0.05 | 24. |

[1] Load on cloth—weight percent based on total weight of cloth.

The data in Table II further illustrates the significant improvement in resin weight loss that is obtained when the fibrous reinforcing element is treated in accordance with the practice of this invention. Note that in Examples 6 and 7 a significant and unexpected increase in thermal stability is obtained using a loading as low as 0.05 weight percent. Example 7 also illustrates that acid derivatives of sulfuric acid such as toluene sulfonic acid may be used successfully in the practice of this invention in order to improve the thermal stability of the composition structures.

Example 8.—Example 5 is repeated here except that asbestos cloth is used as the fibrous reinforcing medium. The resulting impregnated coupon is found to have increased thermal stability comparable to that obtained with the coupons of Example 5.

Example 9.—Example 4 is repeated here except that carbon cloth is used as the fibrous reinforcing medium. The resulting impregnated coupon is found to have increased thermal stability comparable to that obtained with the coupons of Example 4.

Example 10.—Example 5 is repeated here except that graphite fibers are used as the fibrous reinforcing medium. The resulting impregnated coupon is found to have increased thermal stability comparable to that obtained with the coupons of Example 5.

Example 11.—Example 7 is repeated here except that 0.05% of benzene disulfonic acid is loaded onto the glass cloth instead of the toluene sulfonic acid used in Example 7. A comparable increase in the thermal stability of the coupon is obtained.

Example 12.—Example 2 is repeated here except that 2.5% of monoammonium phosphate is loaded onto the glass cloth instead of the ethyl acid phosphate used in Example 2. A comparable increase in the thermal stability of the coupon is obtained.

Example 13.—Example 4 is repeated here except that 0.5% of ethyl acid sulfate is loaded onto the glass cloth instead of the butyl acid phosphate used in Example 4. A comparable increase in the thermal stability of the coupon is obtained.

Examples 14 to 25.—The following examples are set forth to illustrate the various tetracarboxylic components and polyamine components that may be used with the fibrous reinforcing elements that have been treated in accordance with the practice of this invention in order to form reinforced resin impregnated structures with improved thermal stability. In each example the glass cloth of Example 1 is soaked for 4 hours in a 5% by weight solution of butyl acid phosphate to obtain a loading of 2.5 weight percent. The treated glass cloth is then dried, impregnated, cured and tested at 700° F. for resin weight loss according to the procedures outlined in Examples 1 and 2 above. The various monomeric reactants used in each example are set forth below in Table III.

TABLE III.—SUMMARY OF REACTANTS USED IN EXAMPLES 14 TO 25

| Ex. | Solvent | Tetracarboxylic component | Polyamine component | Mole ratio of component tetracarboxylic/Polyamine |
|---|---|---|---|---|
| 14 | NMP/ETOH | BTDA-dipyridine salt | m-Phenylene diamine/melamine. | 1/1:2:1/2 |
| 15 | NMP/ETOH | BTDA-diethyl ester | hexamethylene diamine | 1.1/1 |
| 16 | NMP/ETOH | do | Nonamethylene diamine | 1/1 |
| 17 | NMP/BuOH | BTDA-dibutyl ester | 4,4'-diaminodiphenyl ether | 1/1 |
| 18 | Ethylene glycol | BTDA-diethylene glycol ester | Methylene diamine | 1/1 |
| 19 | BuOH | BTDA-dibutyl ester | m-Phenylene diamine | 1/1 |
| 20 | NMP plus diethyl ester | PMDA-diethyl ester | Hexamethylene diamine | 1/1 |
| 21 | NMP | Benzophenone tetracarboxylic acid | m-Phenylene diamine | 1/1 |
| 22 | NMP/ETOH | BTDA-diethyl ester-diammonium salt. | do | 1/1 |
| 23 | NMP/ETOH | BTDA-diethyl ester | 2,6-diamine pyridine | 1/1 |
| 24 | NMP/ETOH | BTDA-diethyl ester, PMDA-diethyl ester. | m-Phenylene diamine, methylene dianiline. | ½:½, 1½:½ |
| 25 | ETOH | BTDA-tetraethyl ester | 4,4'-oxydianiline | 1/1.4 |

Note.—NMP/ETOH=N-methyl pyrrolidone/ethanol 4/1 by volume; BuOH=Butanol; BTDA=Benzophenone tetracarboxylic acid dianhydride; PMDA=Pyromellitic dianhydride.

In each example a significant increase in the resin thermal stability of the glass coupon is observed when the glass cloth is treated with a 5% by weight solution of butyl acid phosphate so as to give a loading of approximately 2.5 weight percent. This was observed as a marked decrease in resin weight loss as compared with a control sample wherein the cloth was soaked in water which did not contain butyl acid phosphate and which suffered significantly more resin weight loss after prolonged exposure at 700° F.

The following Examples 26 and 27 are set forth to illustrate the improved physical properties that are acheived in 12 ply glass laminates after prolonged aging when the glass cloth used in the individual plies are treated in accordance with the practice of the present invention.

Example 26.—In this example glass cloth of the type used in Example 1 was dipped in a 1% aqueous solution of butyl acid phosphate so as to obtain a wet pickup of about 50% and a loading of about 0.5 weight percent butyl acid phosphate. The cloth is air dried for four hours at room temperature followed by one-half hour at 120° C.

The treated glass cloth is dipped in the monomeric varnish of Example 1 so as to give a 20 mil wet build and then the impregnated sample is B-staged. The details of the process are as follows: The treated cloth is dipped in the varnish, allowed to drain in air for 15 minutes and dried for one hour at 120° C.

Twelve pieces of treated cloth thus impregnated are placed on top of one another and this lay-up is laminated using conventional vacuum bag techniques and an electrically heated hydraulic press. Full vacuum (0.5 mm. of mercury) using a Welch vacuum pump with a Dry Ice trap, is applied to the lay-up at room temperature. After placing the lay-up in a cold press, the temperature of the platens is raised at about 8° F./min. to 350° F. maintaining light contact pressuree. When the platen temperature reaches 250° F. high boiling condensate begins collecting in the trap. By 350° F. almost all of the high boiling condensate is collected. After reaching 350° F. light contact pressure is maintained for an optimum initial contact time, determined as described below. Then 100 p.s.i. augmented pressure is applied and maintained at full vacuum and 350° F. for 1 hour. The laminate is water cooled at 100 p.s.i. plus full vacuum.

The laminates are post cured to 700° F. in 12 hours starting at 350° F. Approximately four hours additional curing at 700° F. are given in order to achieve optimum initial hot strength. One-half (½) inch strips of the laminates are then aged at 700° F. for 175 hours, after which time the laminates are cooled to room temperature and measured for heat loss. The samples are then reheated to 700° F. and tested for flexural strength according to ASTM method D-790. Testing is carried out at 700° F. on an Instron tester using a cross head speed of 0.5 inch/min. and an F-cell. The results of this test are tabulated below in Table IV.

Example 27 (control).—Example 26 is repeated here except that the water in which the glass cloth is dipped is regular tap water and does not contain any butyl acid phosphate or any other additives. The test results on this sample are tabulated below in Table IV.

TABLE IV.—PROPERTIES OF 12 PLY LAMINATES PREPARED IN EXAMPLES 26 AND 27

| Example | Cloth treatment | Percent loading | Percent weight loss [1] | Flexural strength [2] |
|---|---|---|---|---|
| 26 | Butyl acid phosphate | 0.5 | 5.6 | 11,400 |
| 27 (Control) | None | None | 10.4 | 4,200 |

[1] Percent loss measured after 172 hours at 700° F. in air.
[2] Given in p.s.i., measured after 148 hours at 700° F. in air.

The improved flexural strength, that is obtained in glass laminates when the glass colth is treated with a stabilizing agent in accordance with the practice of the present invention, is apparent when one considers the data in the foregoing Table IV. This data illustrates the prolonged useful life of glass laminates that is made possible using the practice of the present invention. Note that a glass cloth loading as low as 0.5 weight percent of butyl acid phosphate provides a laminate with over twice the flexural strength as is obtained in control Example 27, where the glass cloth was not treated with a stabilizing additive.

In the foregoing Examples 26 and 27, glass cloth is used as the fibrous reinforcing medium. However, as will be apparent to those skilled in the art, other fibrous reinforcing media may be used.

The following Examples 28 to 39 are set forth here to further illustrate the wide variations that are possible in the selection of a treating compound for the glass cloth in the practice of this invention. In each example the cloth is treated, impregnated, laminated and tested according to the procedures set forth in Example 26 above. In each case a significant increase in percent weight loss and flexural strength is observed over the control Example 27 after prolonged exposure to high temperatures. Examples 28 to 39 are summarized in Table V below.

TABLE V.—SUMMARY OF EXAMPLES 28 TO 39

| Example | Treating agent | Percent loading |
|---|---|---|
| 28 | Benzene sulfonic acid | 0.05 |
| 29 | Tributyl borate | 2.5 |
| 30 | Toluene sulfonic acid | 0.05 |
| 31 | do | 0.1 |
| 32 | Benzene disulfonic acid | 0.05 |
| 33 | do | 0.1 |
| 34 | Ethyl acid borate | 0.5 |
| 35 | Ethyl acid sulfate | 0.05 |
| 36 | Methyl acid sulfate | 0.05 |
| 37 | n-Butyl hydrogen sulfate | 0.05 |
| 38 | Naphthalene sulfonic acid | 0.05 |
| 39 | Boric acid | 2.0 |

The fibrous reinforcing agents used in the foregoing examples are in the form of cloths or mats. However, it should be noted that the practice of the present invention includes using fibrous reinforcing elements which are in a random, aligned, contiguous or non-woven form. Furthermore, these fibrous reinforcing elements can be reticulate or non-reticulate.

The following Example 40 is set forth to illustrate the practice of the present invention in regard to chopped glass fibers.

Example 40.—Glass roving is chopped so as to provide fibers having a length/diameter ratio ($l/d$) of greater than 100 and a maximum length of ¾ inch. Fifty parts of these fibers are slurried in a 10% aqueous solution of butyl acid phosphate for 30 minutes, filtered to a wet met with a wet pickup of about 35% and then dried for one hour at 120° C. The fibers are then stirred into 350 parts of the polymer forming varnish of Example 1. The solvent is removed by Rinco evaporation until the volatile content of the system is about 10%. The mixture is then pre-heated at 120° C. for 6 hours and then pressed into a mold for one hour at 14,000 p.s.i. and 600° F.

This reinforced molded part exhibits significantly improved thermal stability over a control sample wherein the glass fibers were slurried in regular tap water which did not contain butyl acid phosphate.

Example 41.—In this example a glass batting of the type used in thermal insulation is dipped in a 5% butyl acid phosphate solution to provide a loading of about 3 weight percent. The treated glass batting is air dried for four hours at room temperature and then for 1.5 hours at 120° C. The glass batting is then impregnated with the varnish of Example 1 which has been diluted to 20% solids with ethanol. This impregnated batting is then cured according to the schedule used for Examples 1 and 2.

The oxidative thermal stability at 700° F. in air of this impregnated batting, is significantly greater than a control sample wherein the glass batting is only dipped in regular tap water and is not treated according to the practice of this invention.

The following Examples 42 to 49 are set forth to illustrate the variations in resins which may be used to impregnate glass cloth which is treated in accordance with the teachings of the present invention. The general procedures of Example 1 and 2 are followed here except that different impregnating resins are substituted for that composition used in Examples 1 and 2. In each example a significant increase in thermal stability is achieved when the cloth is treated with ethyl acid phosphate according to the procedures of Example 2. The various impregnating resins are summarized in the following Table VI.

TABLE VI.—IMPREGNATING RESINS USED IN EXAMPLES 42 TO 49

| Example | Resin [1] |
|---|---|
| 42 | Monomeric type varnish—monoethyl ester of trimellitic acid/4/4'-methyldianiline. |
| 43 | Momomeric type varnish—trimellitic acid/4,4'-oxydianiline. |
| 44 | Monomeric type varnish benzophenone 4,3'4' tricarboxylic acid/p-phenylene diamine. |
| 45 | Monomeric type varnish triethyl ester of tricarboxylic acid/p-phenylene diamine. |
| 46 | Polyamide acid prepared from pyromellitic dianhydride and m-phenylene diamine. |
| 47 | Polyamide acid prepared from benzophenone tetracarboxylic acid dianhydride and 4,4'-methylene dianiline. |
| 48 | Polyamide acid prepared from the monochlorohalide of trimellitic anhydride and 4,4'-oxydianiline. |
| 49 | Phenol formaldehyde condensate. |

[1] All monomeric type varnishes use 1/1 mole ratio of carboxylic/amine component.

In the foregoing examples the treating agent for the glass colth is dissolved in water. It should be noted here that any suitable solvent may be used to dissolve the treating agent so long as the solvent does not adversely affect the glass cloth or the treating compound. The solvent used should be sufficiently volatile so as not to require extensive drying time. Examples of suitable solvents would include: ethyl alcohol, methyl alcohol, acetone, methyl ethyl ketone, n-propyl alcohol, isopropyl alcohol, n-butyl alcohol, ethyl acetate, dimethyl acetamide, N-methyl pyrrolidone, benzene, and toluene.

In addition, when alcoholic solutions of the lower alkyl borates such as trimethyl borate, are used as the treating agent, precautions must be taken to prevent their volatilizing during drying of the cloth. This may be accomplished by using small amounts of water in the treating solution or in the cloth. Alternatively, other methods well known to those skilled in the art may be used.

In the foregoing examples the glass cloth is treated either by dipping or soaking in solution. Other methods can be used to introduce the treating agent onto the fibrous reinforcing elements. These alternate methods include spraying the solution onto the cloth, dusting the treating agent onto the cloth, coating the treating agent onto the cloth using fluid bed coating techniques, etc.

The present invention is applicable to the treatment of fibrous reinforcing materials used as the reinforcing element in resin impregnated reinforced structures regardless of the particular form or end use intended for the reinforced structures. Thus, the treated fibrous reinforcing materials may be used as the reinforcing element in single ply coupons, multiple laminates, molded parts, foams, thermal insulation, electrical insulation, etc.

This present invention also contemplates the use of other additives or adjuncts commonly used in the preparation of fibrous reinforced polymeric compositions such as pigments, fillers, extenders, adhesion promoters, blowing agents, foaming agents, etc.

In view of the foregoing it is obvious that many deviations may be made in the products or processes set forth above without departing from the scope of this invention.

What is claimed is:

1. A glass fiber reinforced resin composite comprising:
   (A) a resin component which is the polymeric reaction products of a polycarboxylic compound containing from 3 to 4 carboxylic groups per molecule and a polyamino compound containing at least two primary amino groups per molecule; and
   (B) a glass fiber reinforcing component having loaded thereon 0.05 to 20 weight percent, based on the weight of the glass fiber reinforcing component of a stabilizing additive selected from the group consisting of:
      (1) oxyacids of boron, phosphorous and sulphur,
      (2) alkyl acid phosphates,
      (3) alkyl acid esters of an oxyacid of boron or sulphur,
      (4) ammonium and substituted ammonium phosphates,
      (5) ammonium and substituted ammonium salts of an oxyacid of boron or sulphur,
   wherein the alkyl groups contain from 1 to 8 carbon atoms and wherein the stabilizing additive is loaded onto glass fiber reinforcing component prior to the preparation of the composite.

2. The fiber reinforced resin composite of claim 1 wherein the resin component is the polymeric reaction product of an aromatic tetracarboxylic acid component and a primary diamino compound.

3. The fiber reinforced resin composite of claim 2 wherein the stabilizing additive is an alkyl acid phosphate wherein the alkyl group contains from 1 to 8 carbon atoms.

4. The fiber reinforced resin composite of claim 1 wherein the resin component is the polymeric reaction product of a diethyl ester of benzophenone tetracarboxylic acid and a primary diamino compound and the fiber reinforcing component is a woven network of glass fibers treated with an alkyl acid phosphate, selected from the group consisting of ethyl acid phosphate and butyl acid phosphate.

5. The improved fiber reinforced resin composite of claim 1 wherein the resin component is the polymeric reaction product of a diethyl ester of benzophenone tetracarboxylic acid and a primary diamino compound and the fiber reinforcing component is a woven network of glass fibers treated with a stabilizer additive selected from the group consisting of boric acid, phosphoric acid and sulfuric acid.

6. A glass fiber reinforced resin composite comprising:
   (A) a resin component which is the polymeric reaction product of a benzophenone tetracarboxylic component and an aromatic diamine selected from the group consisting of meta-phenylene diamine, para-phenylene diamine, 4,4'-oxydianiline and 4,4'-methylene dianiline;
   (B) a glass fiber reinforcing component having loaded thereon from 0.05 to 20 weight percent, based on the weight of the glass fiber reinforcing component, of a stabilizing additive selected from the group consisting of alkyl acid phosphates and alkyl acid esters of an oxyacid of boron or sulphur, wherein the alkyl groups contain from 1 to 8 carbon atoms and wherein the stabilizing additive is loaded onto glass fiber reinforcing component prior to the preparation of the composite.

7. The fiber reinforced resin composite of claim 6 wherein the resin component is the polymeric reaction product of a diethyl ester of benzophenone tetracarboxylic acid and meta-phenylene diamine.

8. The fiber reinforced resin composite of claim 6 wherein the resin component is the polymeric reaction product of a diethyl ester of benzophenone tetracarboxylic acid and para-phenylene diamine.

9. The fiber reinforced resin composite of claim 7 wherein the stabilizing additive is an alkyl acid phosphate wherein the alkyl group contains from 1 to 8 carbon atoms.

10. The fiber reinforced resin composite of claim 1 wherein the fiber reinforcing component is a woven network of glass fibers loaded with an alkyl acid phosphate selected from the group consisting of ethyl acid phosphate and butyl acid phosphate.

References Cited

UNITED STATES PATENTS

| | | | |
|---|---|---|---|
| 3,002,857 | 10/1961 | Stalego | 65—3X |
| 3,082,133 | 3/1963 | Hoffman et al. | 117—126GIX |
| 3,110,545 | 11/1963 | Beasley et al. | 117—126GIX |
| 3,146,255 | 8/1964 | Nelson et al. | 260—963X |
| 3,215,515 | 11/1965 | Bacon | 65—30 |
| 3,215,715 | 11/1965 | Wurstner | 260—963X |
| 3,268,312 | 8/1966 | Grant | 65—3 |
| 3,320,114 | 5/1967 | Schulz | 65—30X |
| 3,338,949 | 8/1967 | Hagemeyer et al. | 260—459 |
| 3,342,774 | 9/1967 | Hoegger | 260—78TF |
| 3,347,808 | 10/1967 | Lavin et al. | 260—78TF |
| 3,347,061 | 10/1967 | Pruckmayr | 260—78TF |
| 3,382,135 | 5/1968 | Adams | 65—30X |
| 3,391,120 | 7/1968 | Fritz | 260—78TF |
| 3,416,953 | 12/1968 | Gutzeit et al. | 65—30X |
| 3,427,342 | 2/1969 | Brooks et al. | 260—459X |
| 3,435,004 | 3/1969 | Hathaway et al. | 260—65 |
| 3,445,254 | 5/1969 | Tiede | 65—30X |

WILLIAM J. VAN BALEN, Primary Examiner

M. A. LITMAN, Assistant Examiner

U.S. Cl. X.R.

65—3; 117—126; 161—203; 260—47